N. H. BARBOUR.
PEAT MACHINE.
No. 60,667. Patented Jan. 1, 1867.
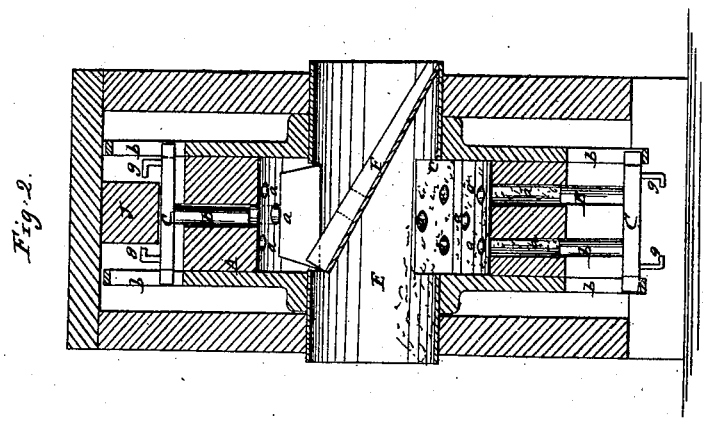
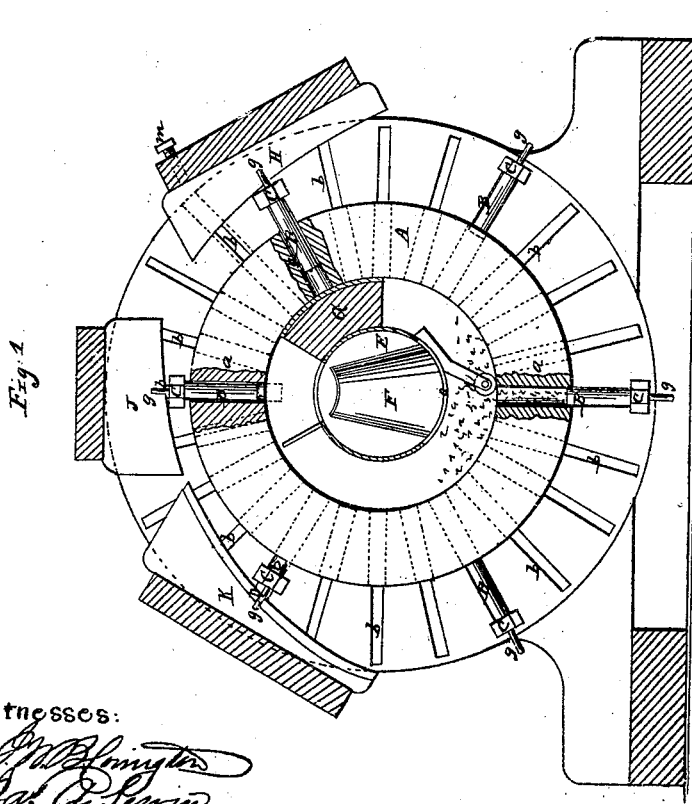

United States Patent Office.

N. H. BARBOUR, OF NEW YORK, N. Y.

Letters Patent No. 60,667, dated January 1, 1867; antedated December 21, 1866.

---

IMPROVED PEAT MACHINE.

---

The Schedule referred to in these Letters Patent and making part of the same.

---

TO ALL WHOM IT MAY CONCERN:

Be it known that I, N. H. BARBOUR, of the city, county, and State of New York, have invented a new and improved Machine for Pressing Peat; and I do hereby declare that the following is a full, clear, and exact description thereof, which will enable others skilled in the art to make and use the same, reference being had to the accompanying drawings, forming part of this specification, in which—

Figure 1 represents a sectional side elevation of this invention.

Figure 2 is a transverse section of the same.

Similar letters of reference indicate like parts.

This invention relates to a peat machine, composed of a revolving annular cylinder, provided with a number of holes and with a series of plungers, which revolve with the cylinder, and move back and forth in the holes, by the action of cams, which draw them out to receive the feed, and force them in at the proper time, for the purpose of compressing the peat while the cylinder is in motion. The peat is fed to the holes in the cylinder through a tube, entering at one side, and the pressed balls or pieces are discharged at the opposite side, by means of an inclined chute.

A represents an annular cylinder, made of metal or any other suitable material, and perforated with a number of accurately bored holes $a$, said holes being made as close together as may be consistent with the strength of the material from which the cylinder is made. The cylinder is three or more inches thick, and the holes pass clear through it, as shown in the drawing, the thickness of the cylinder and the consequent depth of the holes depending upon the amount of compression the peat or other material is to undergo. The inner ends of the holes, $a$, are slightly enlarged, to allow of knocking out the pressed balls with ease and facility. Each of these holes is fitted with a plunger, B, made of iron or any other suitable material, and in order to effect a tight fit, and to allow the moisture contained in the peat or other article to be compressed a free escape, said plungers may be provided at their inner ends with rings or packings, which are made thin at their outer edges, projecting slightly beyond the edges of the plungers, so as to form a shallow cup on the end of the plunger. In this cup may be secured a piece of leather, perforated with fine holes, or any other porous material. There will also be made a few fine holes diagonally through the plunger, through which the moisture forced through the leather or other porous substance may escape. The plungers enter the holes from the outside of the cylinder, and they are secured at their outer ends to cross-heads C, one or more plungers being secured to one and the same cross-head. These cross-heads project through radial slots, $b$, in heads D, which are bolted one to each end of the cylinder, and which project sufficiently far beyond the circumference of the cylinder to afford room for said slots. Through these heads passes a hollow shaft E, round which the cylinder A, with its plungers, revolves. This hollow shaft is of sufficient diameter to allow the feed to be introduced at one end, while the pressed balls of peat are discharged out through the other end over an inclined chute F, as shown clearly in fig. 2 of the drawings. An aperture, $e$, in the lower half of the hollow shaft inside the cylinder allows the feed to drop down into the bottom of the cylinder A, and fill the holes, and a roller, $d$, may be applied to press the material into said holes, causing the same to be filled with partially pressed material. After having been filled, the holes pass over a segment or stamp-seat G, which is secured to the hollow shaft, and extends up to the inner surface of the annular cylinder, being grooved to the same, so as to make a perfect fit; and as the holes in the cylinder successively pass over said stamp-seat the plungers are depressed by the action of a cam, H, which is situated on the outside of the cylinder, and so placed that the plungers begin to move in as soon as the holes have passed over the stamp-seat; and said cam is so shaped that it acts as a thin, long wedge, exerting an enormous power on the material to be compressed, and rendering the same hard and quite dry. Suitable set-screws, $m$, serve to regulate the position of the cam, to produce more or less pressure. The plungers arrive at the end of this cam just before the inner ends of the holes pass off from the stamp-seats, and on arriving near the top of the cylinder, the plungers pass under a second cam, J, which pushes the same down to the inner ends of the holes, causing the balls to discharge over the inclined screen or chute F. In order to reduce the friction between the plungers and cams, said plungers are provided with friction rollers; or instead of placing the friction rollers in the ends of the plungers, the working surfaces of the cams may be constructed of a series of friction rollers. From each cross-head extends a pair of claws or hooks, $g$, and after the plungers have passed under the second cam J, the hooks or claws attached to their cross-heads pass over a third inverted cam, K, which is so shaped that it retracts the plungers, and that, by the time the holes just emptied reach the bottom of the cylinder, they are open, to be again filled in their regular rotation. By these means the process of compressing is continued without interruption, and as many balls are discharged at each revolution of the cylinder as there are holes in the same. A revolving motion will be imparted to the cylinder, A, by a cog-wheel bolted to one of its sides, and geared down as much as is necessary. The cylinder revolves on the hollow shaft, which is supported by the cheek-pieces or standards L, the upper edges of which are united by cross-bars, to which the cams, H J and K, are secured. In practice all these parts will be made of metal, and a powerful and durable machine is thus obtained, which serves to compress peat or other materials with ease and facility.

What I claim as new, and desire to secure by Letters Patent, is—

1. The revolving annular cylinder A, provided with a series of holes $a$, and plungers B, which revolve with said cylinder, in combination with the hollow shaft E, stamp-seat G, and cams H J K, constructed and operating substantially as and for the purpose described.

2. Feeding the material to be compressed through one end of the hollow shaft, and discharging it through the other, substantially as and for the purpose set forth.

3. Making the cam H adjustable substantially as and for the purpose described.

N. H. BARBOUR.

Witnesses:
    WM. F. McNAMARA,
    ALEX. F. ROBERTS.